Figure 1:
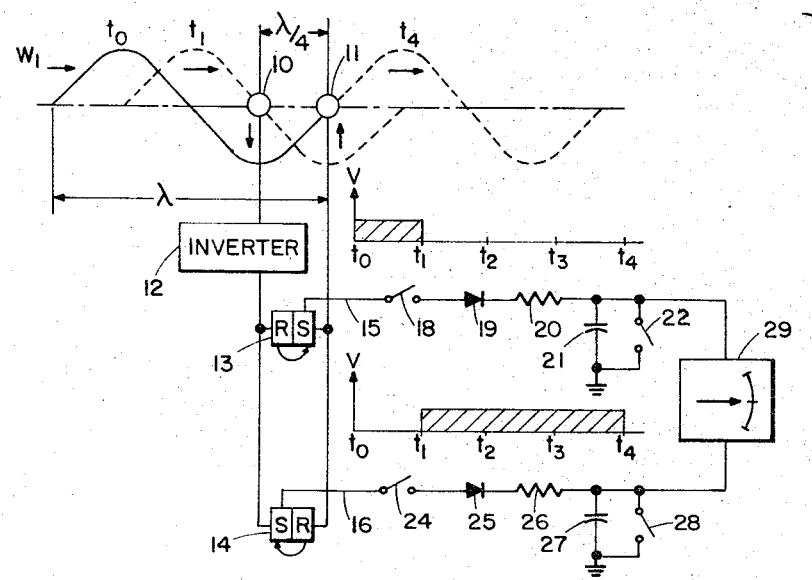

Aug. 29, 1967     D. O. RAIL     3,339,204
ELECTRONIC SYSTEM
Filed March 19, 1965     2 Sheets-Sheet 1

INVENTOR.
Donald O. Rail
BY
*Mueller & Aichele*
ATT'YS.

United States Patent Office 3,339,204
Patented Aug. 29, 1967

1

3,339,204
ELECTRONIC SYSTEM
Donald O. Rail, Oak Park, Ill., assignor to Motorola, Inc.,
Franklin Park, Ill., a corporation of Illinois
Filed Mar. 19, 1965, Ser. No. 441,104
9 Claims. (Cl. 343—113)

This invention relates to a system for the determination of the direction of arrival of a signal by using a statistical signaling processing technique. The time intervals for passage of a signal wave between a pair of transducers is measured and integrated over a time period to determine the direction from which the signal wave is coming.

It is desired in many instances to be able to determine the direction of arrival of signals, when such signals are received together with noise which is random as to amplitude, frequency and direction. Prior systems have been used for this purpose which operate on the phase summation principle, and which use electrically steered antenna arrays and delay compensation techniques. Such prior systems have been found to work satisfactorily under conditions in which the signal is sufficiently stronger than the noise, but they do not operate satisfactorily when the signal is below the level of the noise. Further, such systems have required large and cumbersome antenna or transducer arrays which are relatively expensive, and the signal processing equipment required is complex and costly.

It is, therefore, an object of the present invention to provide an improved system for indicating the direction of a signal from a given direction in the presence of noise having random directional distribution, and which may be stronger than the particular signal.

Another object of the invention is to provide a system for determining the direction from which a signal is received, which utilizes a simple processing circuit which is not critical as to the frequency and amplitude of the signal.

A further object of the invention is to provide an improved direction detecting system wherein the transducer elements are of small size and can be closely spaced to provide a compact unit.

A feature of the invention is the provision of a direction detecting system including at least first and second spaced transducers for receiving waves and converting the same to electrical signals, and apparatus for processing the signals including first and second monostable multivibrators which produce first and second pulse waves representing the passing of signals from the first transducer to the second, and the passage of signals from the second transducer to the first, respectively, and a device for comparing the first and second pulse waves to indicate signals from a given direction.

A further feature of the invention is the provision of a direction detecting system including a plurality of pairs of transducers spaced apart less than one half the wave length of the highest frequency of the waves to be considered, with the pairs being aligned in different directions. Two pairs spaced at right angles can be formed by three transducers to provide a two dimensional indication.

Another feature of the invention is the provision of a system including spaced transducers for receiving waves, and processing apparatus responsive to positive-going zero crossings of the waves at one point and negative-going zero crossings of the waves at a second point to produce pulses having durations representing the time delay between arrival of the waves at the transducers, with differential combining means indicating the direction of waves from a particular direction and eliminating random waves.

Figure 2:
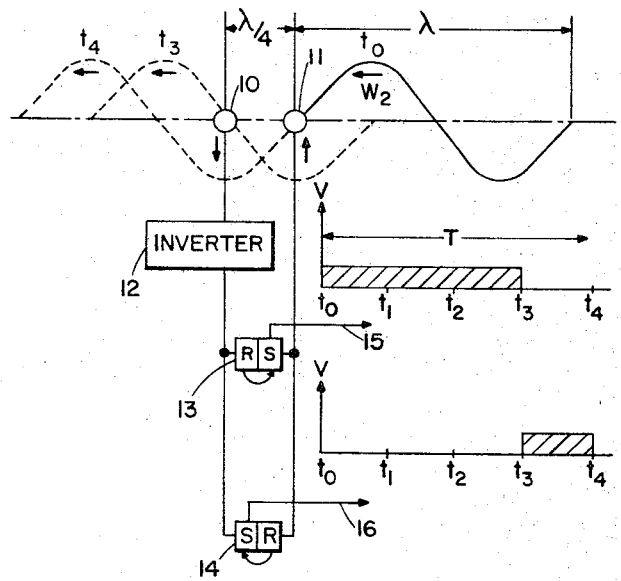
Figure 3:
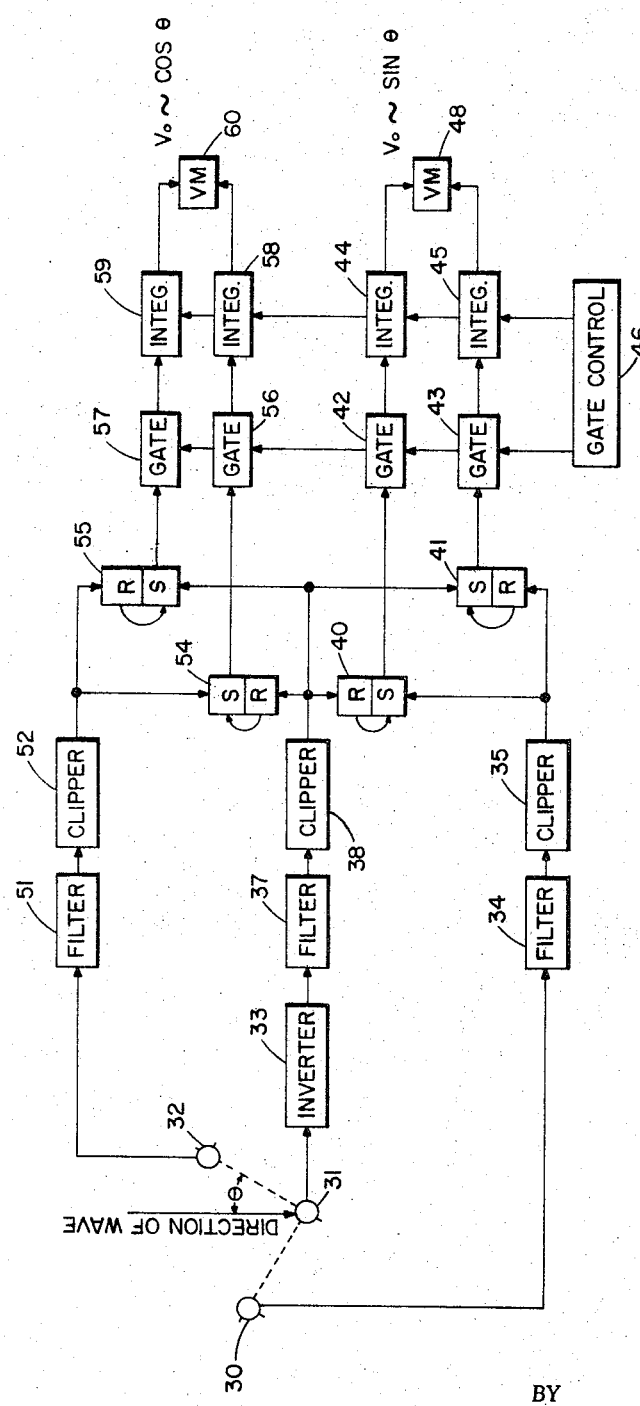

The invention is illustrated in the drawings wherein:
FIG. 1 illustrates a simplified form of the direction detecting system of the invention, and the operation thereof in response to a wave from a particular direction;
FIG. 2 illustrates the operation of the system of FIG. 1 for waves from the opposite direction; and
FIG. 3 is a block diagram illustrating a two dimensional system in accordance with the invention.

The system of the invention can be used for determining the direction of a wave having finite energy content and coming from a given direction during a given time interval in the presence of random signals which are stronger than the wave of interest. The system can be used for waves of audio frequency or radio frequency, transmitted through the air or through water. The waves are picked up by transducers or sensors which are spaced by an amount less than one half a wave length at the highest frequency to be received. Although the system is not critical as to frequency, the waves processed must have a wave length at least twice the spacing of the two sensors. Low pass filters or band pass filters can be used to limit the signals applied from the transducers to the processing equipment. The use of a band pass filter acts to remove the low frequency components which are not of interest. The filtered signals may be clipped to provide square waves having more sharply defined zero crossings. The clipped pulses from the spaced transducers are applied to two multivibrator circuits, each being selectively controlled by pulses from the two transducers. The multivibrator circuits are preferably monostable circuits having a period less than the period of the wave to be detected. The pulses from one transducer are applied to the set stage of the first monostable circuit and to the reset stage of the second monostable circuit. The pulses from the second transducer are applied through an inverter to the reset stage of the first monostable circuit and to the set stage of the second monostable circuit. Outputs are derived from the set stages of the two monostable circuits with one output representing the time difference in arrival at the two transducers by waves from one direction, and the second output representing the time difference in arrival at the two transducers of waves from the opposite direction. The pulses from the two outputs are intergrated to produce voltages which are compared to indicate the direction of a particular wave. Gating circuits are used to control the time interval of integration to a desired time.

FIG. 1 illustrates a system of the invention in simplified form. Transducers 10 and 11 are spaced by a quarter of a wave length at the frequency being considered. Transducer 10 is coupled through inverter 12 to the reset stage of monostable multivibrator 13, and to the set stage of monostable multivibrator 14. The function of inverter 12 can be accomplished by merely interchanging the two leads of transducer 10. Transducer 11 is coupled to the set stage of monostable multivibrator 13 and to the reset stage of monostable multivibrator 14. The monostable circuits respond to the positive-going zero crossings of the wave, and the inverter 12 reverses the phase so that it is actually the negative-going crossings of the wave at transducer 10 which triggers the monostable circuits 13 and 14.

Considering the wave $W_1$ which is in the direction from transducer 10 to transducer 11, at time $t_0$ the positive-going zero crossing occurs at transducer 11. This sets the monostable circuit 13 so that an output is provided from the set stage thereof to output line 15. This is shown by the shaded block from $t_0$ to $t_1$ in the chart above the output line 15. The pulse resulting from the positive-going zero crossing of wave $W_1$ at transducer 11 will also reset monostable circuit 14 so there is no output on conductor 16 connected to the set stage of this monostable circuit. At time $t_1$, a negative-going zero crossing reaches transducer 10. This is reversed in polarity by inverter 12 to reset monostable circuit 13 and set monostable circuit 14. This terminates the output on conductor 15 from the set stage of monostable circuit 13, as is shown in the chart by the termination of the pulse at time $t_1$. As monostable circuit 14 is now set, an output is applied to conductor 16. This output continues until monostable circuit 14 is reset by a positive-going zero crossing of the wave at transducer 11. This occurs at time $t_4$ which is a complete cycle later than time $t_0$. At time $t_4$ the wave at transducer 11 will again set monostable circuit 13 to apply an output to conductor 15.

FIG. 2 shows the same system as FIG. 1 and illustrates the operation in response to a wave $W_2$ moving in the direction from transducer 11 to transducer 10, which is opposite to the direction of the wave $W_1$. At time $t_0$ shown, the wave $W_2$ is crossing zero from negative to positive at transducer 11 to set monostable circuit 13. This provides an output from the set stage to conductor 15, as shown by the chart thereabove. This positive-going crossing resets monostable circuit 14 so that there is no output on conductor 16 connected to the set stage of this monostable circuit. There is no further positive-going zero crossing at transducer 11, or negative-going zero crossing at transducer 10, until time $t_3$ which is ¾ of a cycle later. At this time the wave of transducer 10 has a negative-going zero crossing and this is reversed in polarity by inverter 12 to trigger monostable circuits 13 and 14. Monostable circuit 13 is reset to remove the output on conductor 15, and monostable circuit 14 is set to produce an output on conductor 16. This is all illustrated by the charts above conductors 15 and 16.

It will be seen by comparing FIGS. 1 and 2 that the pulse outputs of the monostable circuits 13 and 14 are reversed in response to the reversal of the direction of the wave applied to transducers 10 and 11. FIG. 1 shows a circuit for gating, integrating and differentially combining the pulses on conductors 15 and 16. Conductor 15 is connected through switch 18 and diode 19 to the integrating circuit including resistor 20 and capacitor 21. Switch 22 is provided to discharge capacitor 21. Conductor 16 is connected through switch 24 and diode 25 to the integrating circuit including resistor 26 and capacitor 27. Switch 28 discharges capacitor 27. To compare the pulses from the two conductors 15 and 16 over a time period, switches 22 and 28 will first be closed to discharge the capacitors 21 and 27. Then at the beginning of the time period switches 22 and 28 will be open and switches 18 and 24 will be closed. The pulses will therefore be applied to the integrating circuits to develop voltages across capacitors 21 and 27. At the end of the time period, the switches 18 and 24 will open. The voltages across capacitors 21 and 27 are applied differentially to indicator 29.

As shown in FIG. 1, the lengths of the pulses on conductor 16 in response to wave $W_1$ are three times as long as the pulses on conductor 15. Accordingly, the voltage on capacitor 27 resulting from wave $W_1$ will be greater than the voltage on capacitor 21. If only the wave $W_1$ is applied to the system, the greater voltage on capacitor 27 will cause the indicator 29 to move to show the direction of the wave applied to the transducers. In response to wave $W_2$, as shown in FIG. 2, the pulses on conductor 15 are three times as long as the pulses on conductor 16. When applied to the circuit as shown in FIG. 1, these pulses will cause capacitor 21 to charge to a greater voltage than the capacitor 27. This will cause indicator 29 to indicate in the opposite direction to show the presence of wave $W_2$. If the waves $W_1$ and $W_2$ are both applied during the interval of observation and are each applied for the same length of time, the pulses on conductors 15 and 16 will have the same duration so that the two voltages applied to the inductor will be the same. In such case no indication is produced.

FIG. 3 shows a two dimensional system for detecting the direction of a wave. In effect, this includes two systems as shown in FIG. 1 positioned at right angles to each other. Transducers 30 and 31 form one system, with the waves picked up by transducer 30 being applied to filter 34 and clipper 35. The filter 34 is either a low pass filter or a band pass filter having an upper cut off frequency at the maximum frequency to be received, as related to the propagation velocity in the medium through which the wave is transmitted. The clipper 35 is arranged to provide a square wave having sharp zero crossings for accurate triggering. The waves from transducer 31 are applied through inverter 33 to filter 37 and clipper 38, which can be the same as the filter 34 and clipper 35. The outputs of the two clippers are applied to monostable circuits 40 and 41.

The two monostable circuits 40 and 41 together form a space-time sequence detector. These monostable circuits operate in the manner previously described in connection with the circuit of FIG. 1. When the monostable circuits are in their set state, a voltage is applied respectively therefrom through gates 42 and 43 to integrating circuits 44 and 45. The outputs of the integrating circuits 44 and 45 are applied to the differential indicating device 48. The gates 42 and 43 are actuated by gate control 46 to apply the pulses from the sequence detector to the integrators during a fixed time period. The integrators 44 and 45 include discharge circuits, also controlled by the gate control 46 to condition the same for operation over the fixed time period. These discharge circuits are equivalent to the switches 22 and 28 which discharge capacitors 21 and 27 in the system of FIG. 1.

The transducer 31 and 32 serve as pickups for a second system which is at right angles to the system including transducers 30 and 31. Signals from transducer 32 are applied to filter 51 and clipper 52, which can be identical to the filter 34 and clipper 35. The outputs of the clippers 38 and 52 are applied to a second space-time sequence detector formed by monostables 54 and 55. These monostable circuits operate in the same way as monostable circuits 40 and 41. The output of monostable circuits 54 and 55 are applied through gates 56 and 57 to integrators 58 and 59. These gates and integrators are both controlled by the gate control 46, in the same way as the gates 42 and 43 and the integrators 44 and 45. The two outputs of integrators 58 and 59 are applied to the differential indicating device 60.

The output of indicator 48 is a measure of the sine of the angle $\theta$ between the wave and the line between transducers 31 and 32. The output of indicator 60 is a measure of the cosine of the angle $\theta$. These two measures completely define the direction of the wave in a plane. If it is desired to provide a three dimensional indication, a third system can be used having the transducers positioned on a line at right angles to the plane including transducers 30, 31 and 32. The transducer 31 can be used in this third system, if desired.

The system of the invention has been found to be effective to determine the direction of either a periodic signal or a random noise signal from a specific direction, in the presence of random noise whose average level after filtering is ten db or more greater than the signal. The overall system can be provided in a compact form. The processing circuit is quite simple, using only two monostable multivibrators to form the space-time sequence detector for each axis. This makes it possible to provide the system at low cost, and the reliability is high because of the small number of components and because the components are not complex.

What is claimed is:
1. A system for receiving signal waves and determining their direction of arrival including in combination, first and second transducers for converting the waves into first and second electric signals respectively, a pair of multivibrators having first and second portions, means connecting said first and second transducers to said first and second portions respectively of both of said multivibrators, said first portion of each of said multivibrators being actuated by a positive-going zero crossing of said first electric signal and said second portion thereof being actuated by a negative-going zero crossing of said second electric signal, first means connected to said first portion of one of said multivibrators for deriving a first pulse wave therefrom, second means connected to said second portion of the other one of said multivibrators for deriving a second pulse wave therefrom, and means coupled to said first and second means and responsive to said first and second pulse waves for indicating the direction of arrival of signal waves at said transducers.

2. A system for receiving signal waves and determining their direction of arrival including in combination, first and second transducers for converting the waves into first and second electric signals respectively, a pair of multivibrators having first and second portions, means connecting said first transducer to said first portions of both of said multivibrators, said first portion of each of said multivibrators being actuated by a positive-going zero crossing of said electric signal, means connecting said second transducer to said second portions of both of said multivibrators, said second portion of each of said multivibrators being actuated by a negative-going zero crossing of said second electric signal, first means connected to said first portion of one of said multivibrators for deriving a first pulse wave therefrom, second means connected to said second portion of the other one of said multivibrators for deriving a second pulse wave therefrom, first and second integrator means coupled to said first and second means and responsive to said first and second pulse waves respectively to provide first and second voltages, and differential indicator means coupled to said integrator means and responsive to the difference in said first and second voltages for indicating the direction of arrival of signal waves with respect to the line connecting said transducers.

3. A system for determining the direction of arrival of a particular wave in the presence of random waves, said system including in combination, first and second transducers for converting the waves into first and second alternating current signals respectively, first and second filters connected to said transducers having outputs for providing signals below a given frequency, said transducers being spaced by a distance of the order of one fourth a wave length at said given frequency, a pair of monostable multivibrators having first and second portions, means connecting said output of said first filter to said first portions of both of said multivibrators, said first portion of each of said multivibrators being actuated by a positive-going zero crossing of said first alternating current signal, means including an inverter connecting said output of said second filter to said second portions of each of said multivibrators, said second portion of each of said multivibrators being actuated by a negative-going zero crossing of said second alternating current signal, first means connected to said first portion of one of said multivibrators for deriving a first pulse wave therefrom, second means connected to said second portion of the other one of said multivibrators for deriving a second pulse wave therefrom, first and second integrator means coupled to said first and second means and responsive to said first and second pulse waves respectively to provide first and second voltages, and differential indicator means coupled to said integrator means and responsive to the difference in said first and second voltages for indicating the direction of arrival of signals with respect to the line connecting said transducers.

4. A system for receiving signal waves and determining their direction of arrival including in combination, first and second transducers for converting the waves into first and second alternating current signals respectively, first and second filters connected to said transducers for rejecting signals above a given frequency, said transducers being spaced by a distance less than one half a wave length at said given frequency, first and second clippers connected to said first and second filters respectively, first and second monostable multivibrators each having a set and a reset portion, means connecting said first clipper to said set portion of said first multivibrator and to said reset portion of said second multivibrator, means including an inverter connecting said second clipper to said reset portion of said first multivibrator and to said set portion of said second multivibrator, first and second integrators each providing a control voltage which varies with the length of pulses applied thereto, first and second gate means connecting said set portions of said first and second multivibrators to said first and second integrators respectively, and differential indicator means coupled to said integrators and responsive to the difference in said first and second voltages for indicating the direction of arrival of signals with respect to the line connecting said transducers.

5. A system for determining the direction of arrival of a particular wave in the presence of random waves, said system including in combination, first and second transducers for converting the waves into first and second alternating current signals respectively, first and second filters connected to said transducers for rejecting signals above a given frequency, said transducers being spaced by a distance less than one half a wave length at said given frequency, first and second clippers connected to said first and second filters respectively and having outputs providing square waves, first and second monostable multivibrators each having a set and a reset portion, said multivibrators automatically returning from the reset to the set condition after a period less than the period of a wave at said given frequency, means connecting said output of said first clipper to said set portion of said first multivibrator and to said reset portion of said second multivibrator, means including an inverter connecting said output of said second clipper to said reset portion of said first multivibrator and to said set portion of said second multivibrator, first and second integrators each providing a control voltage which varies with the length of pulses applied thereto, first and second gate means connecting said set portions of said first and second multivibrators to said first and second integrators respectively for a given time duration, and differential indicator means coupled to said integrators and responsive to the difference in said first and second voltages for indicating the direction of arrival of signals with respect to the line connecting said transducers.

6. A system for determining the direction of arrival of a particular wave in the presence of random waves, said system including in combination, first and second transducers for converting the waves into first and second alternating current signals respectively, first and second low pass filters connected to said transducers having outputs providing signals below a given frequency, said transducers being spaced by a distance less than one quarter of a wave length at said given frequency, first and second clippers connected to said outputs of first and second filters respectively and having outputs providing square waves, first and second monostable multivibrators each having a set and a reset portion, said multivibrators automatically returning from the reset to the set condition after a period less than the period of a wave at said given frequency, means connecting said output of said first clipper to said set portion of said first multivibrator and to said reset portion of said second multivibrator, means including an inverter connecting said output of said second clipper to said reset portion of said first multivibrator and to said set portion of said second multivibrator, first and second integrators each providing a control voltage which varies with the length of pulses applied thereto, means connecting said set portions of said first and second multivibrators to said first and second integrators respectively, and differential indicator means coupled to said integrators and responsive to the difference in said first and second voltages for indicating the direction of arrival of signals with respect to the line connecting said transducers.

7. A system for determining the direction of arrival of a particular signal wave in the presence of random waves received from various directions, said system including in combination, first and second pairs of transducers for converting the waves into electrical signals, said transducers of each pair being positioned on a line with the lines for the two pairs extending at an angle with respect to each other, first and second filters connected to said transducers of each pair and having outputs providing signals below a given frequency, said transducer of each pair being spaced by a distance less than one half a wave length at said given frequency, first and second monostable multivibrators each having a set and a reset portion, means connecting said output of said first filter to said set portion of said first multivibrator and to said reset portion of said second multivibrator, means including an inverter connecting said output of said second filter to said reset portion of said first multivibrator and to said set portion of said second multivibrator, first and second integrators each providing a control voltage which varies with the length of pulses applied thereto, means connecting said set portions of said first and second multivibrators to said first and second integrators respectively, and differential indicator means coupled to said integrators and responsive to the difference in said first and second voltages for indicating the direction of arrival of a signal wave with respect to the line connecting said transducers.

8. A system for determining the direction of arrival of a particular signal wave in the presence of random waves received from various directions, said system including in combination, first and second pairs of transducers for converting the waves into alternating current signals, said transducers of each pair being positioned on a line with the lines for the two pairs extending at an an angle of ninety degrees with respect to each other, first and second filters connected to said transducers of each pair for rejecting signals above a given frequency, said transducer of each pair being spaced by a distance less than one half a wave length at said given frequency, first and second clippers connected to said first and second filters respectively, first and second monostable multivibrators each having a set and a reset portion, means connecting said first clipper to said set portion of said first multivibrator and to said reset portion of said second multivibrator, means including an inverter connecting said second clipper to said reset portion of said first multivibrator and to said set portion of said second multivibrator, first and second integrators each providing a control voltage which varies with the length of pulses applied thereto, first and second gate means connecting said set portions of said first and second multivibrators to said first and second integrators respectively, and differential indicator means coupled to said integrators and responsive to the difference in said first and second voltages for indicating the direction of arrival of a signal wave with respect to the line connecting said transducers.

9. A system for determining the direction of arrival of a particular signal wave in the presence of random waves received from various directions, said system including in combination, first and second pairs of transducers for converting the waves into alternating current signals, said transducers of each pair being positioned on a line with the lines for the two pairs extending at an angle of ninety degrees with respect to each other, first and second filters connected to said transducers of each pair and having outputs providing signals below a given frequency, said transducer of each pair being spaced by a distance less than one half a wave length at said given frequency, first and second clippers connected to said outputs of said first and second filters respectively and having outputs providing square waves, first and second monostable multivibrators each having a set and a reset portion, means connecting said first clipper to said set portion of said first multivibrator and to said reset portion of said second multivibrator for actuating the same by positive-going zero crossings of said square waves, means including an inverter connecting said second clipper to said reset portion of said first multivibrator and to said set portion of said second multivibrator for actuating the same by negative-going zero crossings of said square waves, said multivibrators automatically returning from the reset to the set condition after a period less than the period of a wave at said given frequency, first and second integrators each providing a control voltage which varies with the length of pulses applied thereto, first and second gate means connecting said set portions of said first and second multivibrators to said first and second integrators respectively for a predetermined time period, and differential indicator means coupled to said integrators and responsive to the difference in said first and second voltages for indicating the direction of arrival of a signal wave with respect to the line connecting said transducers.

References Cited

UNITED STATES PATENTS

| | | |
|---|---|---|
| 2,535,255 | 12/1950 | Barnes et al. |
| 3,021,481 | 2/1962 | Kalmus et al. |
| 3,078,415 | 2/1963 | Frelich. |
| 3,155,972 | 11/1964 | Boyer. |
| 3,205,438 | 9/1965 | Buck. |

OTHER REFERENCES

The Language and Symbology of Digital Computer Systems, RCA, QA76.5RCC.4, pp. 30–31.

RODNEY D. BENNETT, *Primary Examiner.*

CHESTER L. JUSTUS, *Examiner.*

C. E. WANDS, *Assistant Examiner.*